United States Patent
Kim et al.

(10) Patent No.: US 9,436,034 B2
(45) Date of Patent: Sep. 6, 2016

(54) DISPLAY DEVICE HAVING A FIRST POLARIZATION LAYER COMPRISING AN ISOTROPIC MACROMOLECULAR MATERIAL AND A SECOND POLARIZER LAYER COMPRISING A MACROMOLECULAR MATERIAL HAVING A POSITIVE BIREFRINGENCE, THE FIRST AND SECOND POLARIZERS LAYERS STACKED ON EACH OTHER

(71) Applicant: Samsung Display Co., Ltd., Yongin, Gyeonggi-do (KR)

(72) Inventors: Sang-Jae Kim, Seongnam-si (KR); Boo-Kan Ki, Yongin-si (KR); Ji-Hye Kim, Hwaseong-si (KR); Hee-Wook Do, Cheonan-si (KR); Jae-Won Park, Seoul (KR); Duck-Jong Suh, Seoul (KR); Jung-Hun Lee, Seoul (KR); Hyoung-Joo Lee, Gongju-si (KR); Seon-Ah Cho, Busan (KR); Hyo-Sung Hong, Suwon-si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 226 days.

(21) Appl. No.: 14/017,672

(22) Filed: Sep. 4, 2013

(65) Prior Publication Data

US 2014/0146273 A1  May 29, 2014

(30) Foreign Application Priority Data

Nov. 23, 2012  (KR) .................. 10-2012-0133365

(51) Int. Cl.
*G02F 1/1335*  (2006.01)

(52) U.S. Cl.
CPC ... *G02F 1/133536* (2013.01); *G02F 1/133524* (2013.01); *G02F 2001/133531* (2013.01)

(58) Field of Classification Search
CPC ............. G02F 1/133536; G02F 2001/133631; G02F 2001/133545; G02F 1/133512; G02F 1/133555; G02F 2001/134345; G02F 1/133524; G02B 27/26; G02B 5/3083; G02B 6/0033; G02B 6/0035; G02B 6/0055; H04N 13/0434; G09G 3/003; G01J 3/02; G01J 3/0283; G01J 3/0224; G01N 21/65; H01L 27/322; H01L 51/5281; B41M 5/395

See application file for complete search history.

(56) References Cited

U.S. PATENT DOCUMENTS 6,480,248 B1  11/2002  Lee et al.
7,817,106 B2  10/2010  Fukushima et al.
(Continued)

FOREIGN PATENT DOCUMENTS

JP  2008090173  4/2008
JP  2011232681  11/2011
(Continued)

*Primary Examiner* — Huyen Ngo
(74) *Attorney, Agent, or Firm* — F. Chau & Associates, LLC

(57) ABSTRACT

A display panel includes a first substrate, a second substrate, a liquid crystal layer, a first polarizer, a second polarizer and a viewing angle control layer. The second substrate faces the first substrate. A liquid crystal layer is disposed between the first substrate and the second substrate. A first polarizer is disposed on a lower surface of the first substrate and includes a first polarizing layer and a second polarizing layer stacked on each other. A second polarizer is disposed on an upper surface of the second substrate. A viewing angle control layer is disposed on the first polarizer and is configured to control a viewing angle of a column direction of the display panel.

24 Claims, 5 Drawing Sheets

(56) References Cited

U.S. PATENT DOCUMENTS

| | | |
|---|---|---|
| 7,932,975 B2 | 4/2011 | Sakai et al. |
| 7,936,422 B2 | 5/2011 | Adachi et al. |
| 8,189,147 B2 | 5/2012 | Sakai et al. |
| 2005/0213003 A1* | 9/2005 | Kaneko .......................... 349/114 |
| 2010/0002171 A1* | 1/2010 | Yoshimi .......................... 349/96 |
| 2010/0073604 A1* | 3/2010 | Okuyama et al. .............. 349/75 |
| 2011/0102690 A1* | 5/2011 | Kikuchi et al. ................. 349/15 |
| 2011/0249333 A1* | 10/2011 | Kuriyama et al. ....... 359/489.07 |
| 2012/0154463 A1* | 6/2012 | Hur et al. ...................... 345/691 |
| 2012/0162763 A1* | 6/2012 | Son .................... G02B 27/2214 359/463 |
| 2012/0287504 A1* | 11/2012 | Jang ....................... G02B 27/26 359/463 |
| 2013/0293802 A1* | 11/2013 | Chae ............................... 349/58 |

FOREIGN PATENT DOCUMENTS

| | | |
|---|---|---|
| KR | 1020070111037 | 11/2007 |
| KR | 1020110024079 | 3/2011 |

* cited by examiner

DISPLAY DEVICE HAVING A FIRST POLARIZATION LAYER COMPRISING AN ISOTROPIC MACROMOLECULAR MATERIAL AND A SECOND POLARIZER LAYER COMPRISING A MACROMOLECULAR MATERIAL HAVING A POSITIVE BIREFRINGENCE, THE FIRST AND SECOND POLARIZERS LAYERS STACKED ON EACH OTHER

This application claims priority to Korean Patent Application No. 10-2012-0133365, filed on Nov. 23, 2012, the disclosure of which is hereby incorporated by reference herein in its entirety.

TECHNICAL FIELD

Example embodiments relate to a display panel and a display device having the same. More particularly, example embodiments relate to a display panel including a viewing angle control layer and a reflective polarizer, and a display device having the same.

DISCUSSION OF THE RELATED ART

A Liquid Crystal Display LCD device is one type of flat display device. The LCD device is a display device that applies voltages to specific molecules of liquid crystal to convert arrangements of the molecules and change an optical property of the liquid crystal cell such as, for example, a birefringence, an optical activity, a dichroism, a light scattering, etc, to display an image.

Generally, the display panel includes a liquid crystal layer disposed between two substrates. A liquid crystal is, for example, injected between two substrates, to thereby form the liquid crystal layer. Two polarizers may be disposed on outer surfaces of two substrates. For example, a reflection polarizer and an absorption polarizer may pass or absorb light of a specific polarization, to thereby display an image. The reflection polarizer may pass only light of a specific polarization and reflect light of another polarization. The absorption polarizer may pass only light of a specific polarization and absorb light of another polarization. However, because the display panel includes different type of polarizers, the brightness may be decreased and the manufacturing costs associated therewith may be increased.

Additionally, an optical sheet may be used to increase the brightness of a display device. For example, the optical sheet may include a dual brightness enhancement film (DBEF). DBEF may recycle a polarization which is reflected by the reflection polarizer. Therefore, a luminance efficiency of the display device may be increased by a polarization recycling.

However, in consideration of the cost of DBEF, new reflection polarizers have been developed. The new reflection polarizer may include, for example, a cholesteric liquid crystal (CLC), a wire grid polarizer (WGP) or a birefringence optical fiber.

When the display device includes only the reflection polarizer, a reddish phenomenon may occur in a vertical direction, such as, for example, a column direction of the display panel.

SUMMARY

Example embodiments provide a display panel capable of increasing the brightness and preventing a reddish phenomenon in a column direction of the display panel.

Example embodiments also provide a display device including the above-mentioned display panel.

In accordance with an example embodiment, a display panel includes a first substrate, a second substrate, a liquid crystal layer, a first polarizer, a second polarizer and a viewing angle control layer. The second substrate faces the first substrate. A liquid crystal layer is disposed between the first substrate and the second substrate. A first polarizer is disposed on a lower surface of the first substrate and includes a first polarizing layer and a second polarizing layer stacked on each other. A second polarizer is disposed on an upper surface of the second substrate. A viewing angle control layer is disposed on the first polarizer and is configured to control a viewing angle of a column direction of the display panel.

In an example embodiment, the viewing angle control layer may be disposed on the upper surface of the second polarizer.

In an example embodiment, the viewing angle control layer may be disposed between the first substrate and the first polarizer.

In an example embodiment, the first polarizer may be a reflection polarizer, and the second polarizer is an absorption polarizer.

In an example embodiment, the first polarizer and the second polarizer may be a reflection polarizer.

In an example embodiment, an absorption axis of the second polarizer may be parallel to a reflection axis of the first polarizer.

In an example embodiment, the viewing angle control layer may include a viewing angle control film. The viewing angle control film may include a base sheet and a protrusion portion protruding from an upper surface of the base sheet and extending in a direction.

In an example embodiment, an absorption axis of the viewing angle control layer may be parallel to a reflection axis of the first polarizer.

In an example embodiment, the viewing angle control layer may include a pattern retarder.

In an example embodiment, the pattern retarder may include a base layer, a pattern retarding layer and an adhesive layer. The base layer may have a birefringence. The pattern retarding layer may be disposed on a lower surface of the base layer and may include patterns having a different optical axis from each other. The adhesive layer may be disposed on a lower surface of the pattern retarding layer.

In an example embodiment, the pattern retarding layer may include a first retarder, a second retarder and a black matrix. The first retarder may be configured to convert a first light to a first polarization. The second retarder may be configured to convert a second light to a second polarization. The black matrix may be disposed on lower surfaces of the first retarder and the second retarder to cover boundary portions between the first retarder and the second retarder.

In an example embodiment, the black matrix may be parallel to a reflection axis of the first polarizer.

In an example embodiment, the viewing angle control layer may include a parallax barrier layer. The parallax barrier layer may include a plurality of parallax barriers and a wire grid polarizer. The wire grid polarizer may be disposed between the plurality of parallax barriers.

In an example embodiment, an absorption axis of the parallax barrier may be parallel to a reflection axis of the first polarizer.

In accordance with example embodiment, a display device includes a display panel and a backlight assembly. The display panel includes a first substrate, a second substrate, a liquid crystal layer, a first polarizer, a second polarizer and a viewing angle control layer. The second substrate faces the first substrate. The liquid crystal layer is disposed between the first substrate and the second substrate. The first polarizer is disposed on a lower surface of the first substrate and includes a first polarizing layer and a second polarizing layer stacked on each other. The second polarizer is disposed on a upper surface of the second substrate. The viewing angle control layer is disposed on the first polarizer and is configured to control a viewing angle of a column direction of the display panel. The backlight assembly is configured to provide a light to the display panel.

In an example embodiment, the viewing angle control layer may be disposed on an upper surface of the second polarizer.

In an example embodiment, the viewing angle control layer may be disposed between the first substrate and the first polarizer.

In an example embodiment, the viewing angle control layer may include a viewing angle control film. The viewing angle control film may include a base sheet and a protrusion portion. The protrusion portion may be protruding from an upper surface of the base sheet and may be extending in a direction.

In an example embodiment, the viewing angle control layer may include a pattern retarder. The pattern retarder may include a base layer, a pattern retarding layer and an adhesive layer. The base layer may have a birefringence. The pattern retarding layer may be disposed on a lower surface of the base layer and may include patterns having a different optical axis from each other. The adhesive layer may be disposed on a lower surface of the pattern retarding layer.

In an example embodiment, the viewing angle control layer may include a parallax barrier layer and a wire grid polarizer. The parallax barrier layer may include a plurality of parallax barriers. The wire grid polarizer may be disposed between the plurality of parallax barriers.

In accordance with an example embodiment, a display device which includes a display panel and a backlight assembly is provided. The display panel includes a first substrate, a second substrate facing the first substrate, a liquid crystal layer disposed between the first substrate and the second substrate, a first polarizer disposed on a lower surface of the first substrate and including a first polarizing layer and a second polarizing layer stacked on each other, a second polarizer disposed on an upper surface of the second substrate, and a viewing angle control layer disposed on the first polarizer and configured to control a viewing angle of a column direction of the display panel, and an optical sheet disposed on a lower surface of the first polarizer.

In addition, the display device further includes a backlight assembly disposed on a lower surface of the optical sheet and configured to provide a light to the display panel.

In accordance with example embodiments of the present invention, a display panel and a display device having the same, a reflection polarizer may be applied as a first polarizer of the display panel. Thus, optical materials may be reduced and the brightness of the display panel may increase. Accordingly, a film for increasing the brightness may not be needed, so that manufacturing costs may be decreased.

Furthermore, the display panel includes a viewing angle control layer. The viewing angle control layer includes a viewing angle control film, a pattern retarder or a parallax barrier layer. When the reflection polarizer is applied as a first polarizer, a reddish phenomenon may be prevented. Accordingly, a viewing angle at a column direction of the display panel may be decreased by including the viewing angle control layer, so that the reddish phenomenon may be prevented.

BRIEF DESCRIPTION OF THE DRAWINGS

Example embodiments of the invention can be understood in more detail from the following detailed description taken in conjunction with the accompanying drawings, in which.

DETAILED DESCRIPTION OF EXAMPLE EMBODIMENTS OF THE INVENTION

Figure 1:
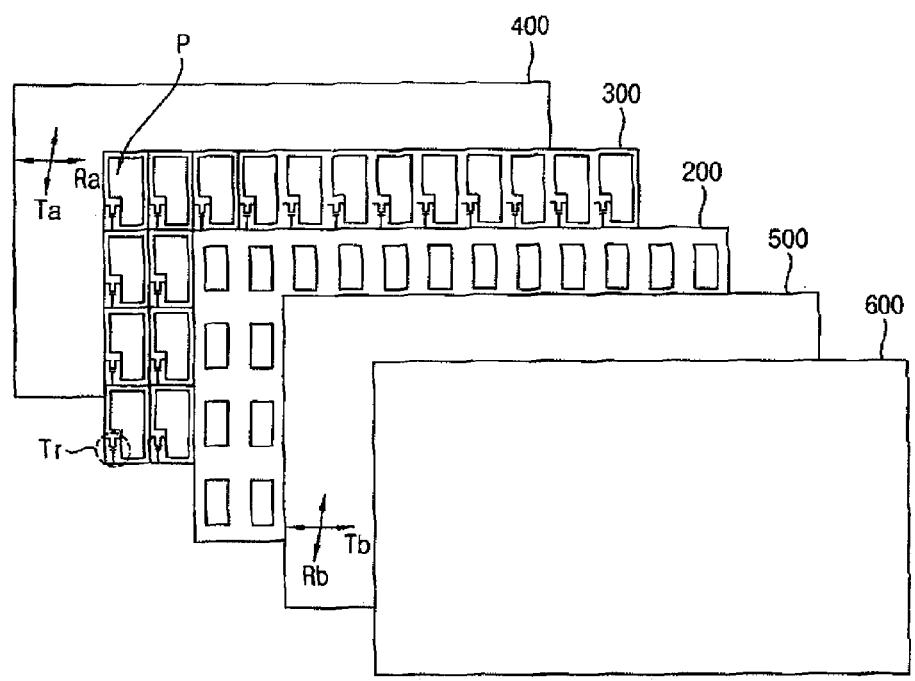
FIG. 1 is a plan view illustrating a display panel in accordance with an example embodiment.

Hereinafter, example embodiments will be explained in detail with reference to the accompanying drawings.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Figure 2:
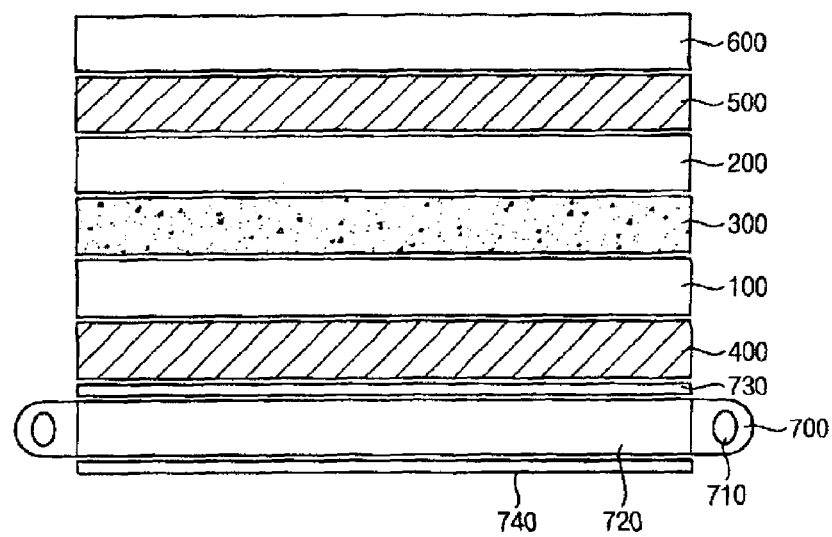
FIG. 2 is a cross-sectional view illustrating a display device including the display panel of FIG. 1.
Figure 3:
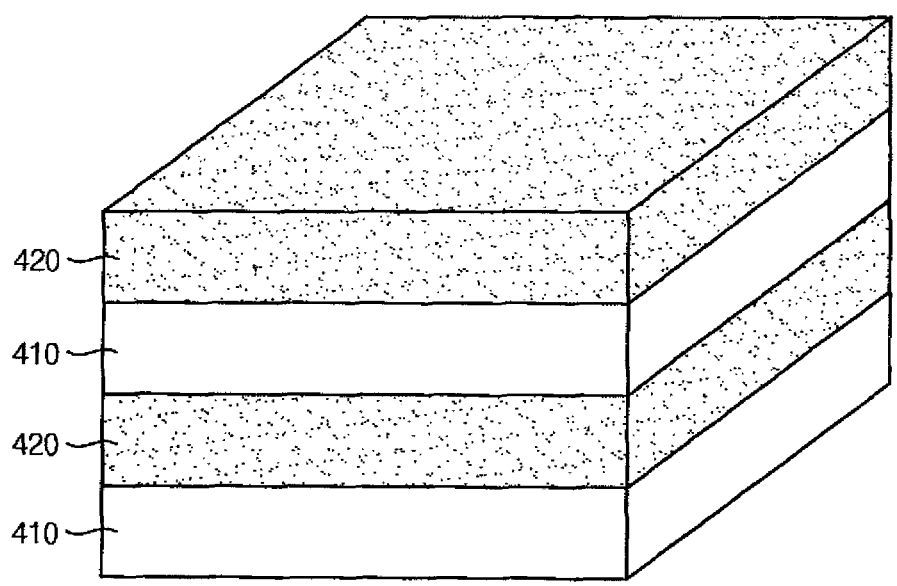
FIG. 3 is a perspective view illustrating a reflection polarizer in the display panel of FIG. 1.

FIG. 1 is a plan view illustrating a display panel in accordance with an example embodiment. FIG. 2 is a cross-sectional view illustrating a display device including the display panel of FIG. 1. FIG. 3 is a perspective view illustrating a reflection polarizer in the display panel of FIG. 1.

Referring to FIGS. 1 to 3, a display device includes, for example, a first substrate 100, a second substrate 200, a liquid crystal layer 300, a first polarizer 400, a second polarizer 500, a viewing angle control layer 600, a backlight assembly 700 and an optical sheet 730.

The first substrate 100 and the second substrate 200 may be, for example, a transparent insulation substrate. For example, the transparent insulation substrate may include a glass substrate, a quartz substrate, or a plastic substrate, etc. Further, in an example embodiment, the transparent insulation substrate may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or a combination thereof.

The first substrate 100 may be, for example, a thin film transistor substrate including thin film transistors Tr. The thin film transistor Tr substrate includes, for example, a plurality of transistors Tr, which are formed in a matrix shape. The first substrate 100 may include a plurality of gate lines GL and a plurality of data lines DL which are connected to the thin film transistors Tr respectively.

The first substrate 100 may further include a plurality of pixel electrodes PE which are connected to the thin film transistors Tr respectively. The pixel electrodes PE may include, for example, a transparent conductive oxide material, such as indium tin oxide (ITO), indium zinc oxide (IZO), aluminum doped ZnO (AZO), cadmium zinc oxide (CZO), indium gallium zinc oxide (IGZO), or a combination thereof.

The second substrate 200 may include, for example, a common electrode CE which faces to the pixel electrode. Alternatively, the common electrode CE may be disposed on, for example, the first substrate 100. The common electrode CE may include, for example, a transparent conductive oxide material, such as indium tin oxide (ITO), indium zinc oxide (IZO), aluminum doped ZnO (AZO), cadmium zinc oxide (CZO), indium gallium zinc oxide (IGZO), or a combination thereof.

The second substrate 200 may be, for example, a color filter substrate having color filters. The color filter substrate converts a light which is incident from the backlight assembly 700 to a desired color. For example, the second substrate 200 may include a first color filter, a second color filter and a third color filter. The second substrate 200 may further include, for example, a black matrix BM which is disposed between the first, second and third color filters. For example, the first color filter may be a red color filter R. The second color filter may be, for example, a green color filter G. The third color filter may be, for example, a blue color filter B. Alternatively, the color filters may be disposed on, for example, the first substrate 100.

The liquid crystal (LC) layer 300 may be disposed between the first substrate 100 and the second substrate 200. The liquid crystal layer 300 may include, for example, liquid crystal molecules having an optical anisotropy. The liquid crystal molecule is driven by an electric field, so that the liquid crystal molecule transmits or blocks a light, to thereby display an image.

The first polarizer 400 may be disposed on, for example, a lower surface of the first substrate 100. The backlight assembly 700 may be disposed on, for example, a lower surface of the first polarizer 400. The optical sheet 730 may be disposed, for example, between the first polarizer 400 and the backlight assembly 700.

The second polarizer 500 may be disposed on, for example, an upper surface of the second substrate 200. The second polarizer 500 may be positioned, for example, adjacent to a viewer. The second polarizer 500 may include, for example, an adhesion layer (not illustrated) to be adhered to the second substrate 200. The adhesion layer may include, for example, a pressure sensitivity adhesive. The adhesion layer may be formed, for example, in a film type. The adhesion layer is adhered to the second substrate 200 in response to an outer pressure.

The display panel according to an example embodiment may further include, for example, a viewing angle control layer 600 to decrease a viewing angle in a column direction of the display panel.

The viewing angle control layer 600 may be disposed, for example, on an upper surface of the second polarizer 500. Alternatively, the viewing angle control layer 600 may be disposed, for example, between the first substrate 100 and the first polarizer 400.

An absorption axis Tc (not illustrated) of the viewing angle control layer 600 may be, for example, perpendicular to the column direction of the display panel. That is, the absorption axis of the viewing angle control layer 600 may be, for example, parallel with the reflection axis Ra of the first polarizer 400 and the absorption axis Tb of the second polarizer 500.

Figure 8:
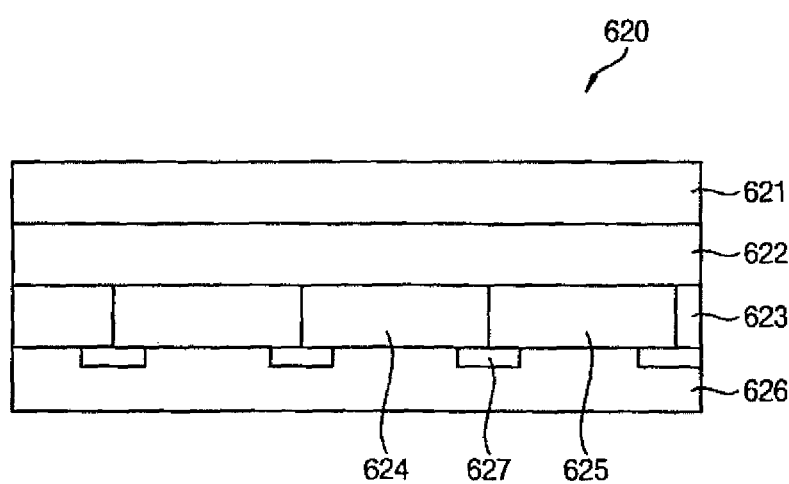
FIG. 8 is a cross-sectional view illustrating the pattern retarder in the display panel of FIG. 7.
Figure 9:
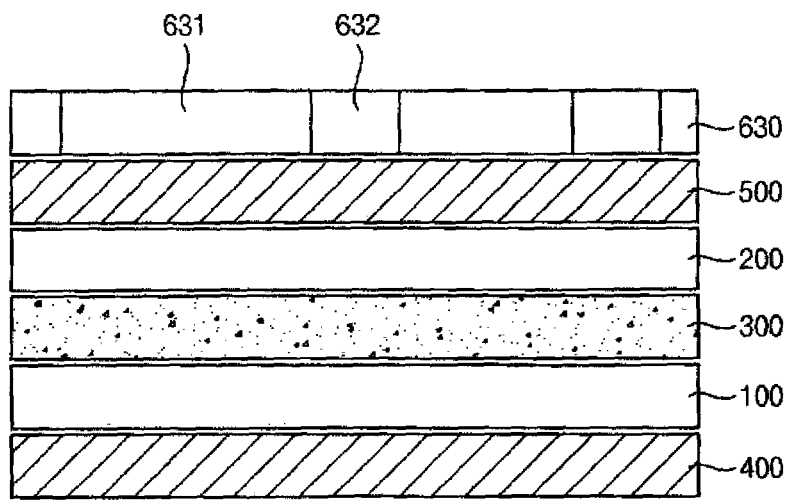
FIG. 9 is a cross-sectional view illustrating a display panel in accordance with an example embodiment including a parallax barrier layer.

The viewing angle control layer 600 may include a viewing angle control film (See FIGS. 4 and 5), a pattern retarder (See FIGS. 7 and 8) or a parallax barrier layer (See FIG. 9).

The backlight assembly 700 may provide a light to the display panel. The backlight assembly 700 may be disposed, for example, under the display panel.

The backlight assembly 700 may include, for example, a light guide plate 720, a reflection plate 740 and a light source 710 which generates a light.

The backlight assembly 700 may include, for example, at least one light source 710 disposed in a side of the backlight assembly 700. The light source 710 may generate a light to the light guide plate 720.

Examples of the light source 710 may include but are not limited to a cold cathode fluorescent lamp (CCFL), an external electrode fluorescent lamp (EEFL), a flat fluorescent lamp (FFL), a light emitting diode (LED), an electro luminescence (EL), and hot cathode fluorescent lamp (HCFL). The light source 710 may be, for example, a point light source or a linear light source.

The light guide plate 720 may convert, for example, an incident light from the point light source or the linear light source into an outgoing light having a plane light source. That is, the light guide plate 720 converts a light path. Moreover, the light guide plate 720 may be formed of, for example, a resin based material such as at least one of a polymethylmethacrylate (PMMA), a polyethylene terephthalate (PET) resin, a polycarbonate (PC) resin, a cyclic olefin copolymer (COC) resin, and a polyethylene naphthalate (PEN) resin.

The reflection plate 740 may be disposed, for example, on a lower surface of the light guide plate 720. The reflection plate 740 reflects a light which is emitted to the light guide plate 720, to thereby increase luminance efficiency. For example, in an example embodiment, reflective plate 740 may be formed of a plastic such as polyethyleneterephthalate (PET) or polycarbonate (PC).

The optical sheet 730 may be disposed, for example, on an upper surface of the backlight assembly 700. The optical sheet 730 may include, for example, a plurality of sheets. Examples of the optical sheet may be, for example, a protection sheet, a diffusion sheet, a prism sheet, etc. Alternatively, for example, in an example embodiment, the optical sheet 730 may be omitted.

Referring again to FIG. 3, the reflection polarizer may include, for example, a plurality of polarizing layers stacked on each other and having a different reflective index from each other. In the present embodiment, the reflection polarizer may include, for example, a first polarizing layer 410 and a second polarizing layer 420 stacked on each other. The first polarizing layer 410 includes, for example, a birefringence material. The second polarizing layer 420 includes, for example, a material having a reflective index different from the birefringence material of the first polarizing layer 410.

Furthermore, the second polarizing layer 420 of the reflection polarizer may include, for example, a macromolecular material having a positive birefringence. The first polarizing layer 410 of the reflection polarizer may include, for example, an isotropic macromolecular material. For example, a polyvinyl alcohol film may be stretched and dyed with iodine or dichroic dye to form the absorption polarizer. An axis of the absorption polarizer may be formed to be, for example, perpendicular to the stretched direction of the polyvinyl alcohol film.

The first polarizer 400 may include, for example, the reflection polarizer and the second polarizer 500 may include the absorption polarizer. Alternatively, both of the first polarizer 400 and the second polarizer 500 may include, for example, the reflection polarizer.

When the absorption polarizer and the reflection polarizer are used together, a reflection axis of the reflection polarizer may be, for example, parallel to an absorption axis of the absorption polarizer. When both of the first polarizer 400 and the second polarizer 500 include the reflection polarizer, a reflection axis of the first polarizer may be, for example, perpendicular to a reflection axis of the second polarizer.

The absorption axis Tb of the second polarizer 500 may be, for example, perpendicular to the absorption axis Ta of the first polarizer 400. A reflection axis Rb of the second polarizer 500 may be, for example, parallel to an absorption axis Ta of the first polarizer 400.

A light, which vibrates in a first direction and a second direction, may be incident from the backlight assembly 700 to the first polarizer 400. A light, which vibrates in the first direction perpendicular to the reflection axis Ra of the first polarizer 400 including the reflection polarizer, may only pass through the first polarizer 400. Thus, a light which vibrates in the second direction may be reflected by the first polarizer 400.

The second polarizer 500 may be disposed, for example, on an upper surface of the second substrate 200. The second polarizer 500 may include, for example, the absorption polarizer. A light, which passes through the first polarizer 400 and a liquid crystal layer 300 to which an electric field is applied, may be incident to the second polarizer 500. A light, which vibrates in the second direction parallel to the absorption axis Tb of the second polarizer 500 including the absorption polarizer, may only pass through the second polarizer 500.

The reflection polarizer may allow a light, which has a specific direction, to pass through and may reflect a light which has another direction. Thus, the reflection polarizer may linearly polarize a light emitted from the backlight assembly to about 100 percent. Accordingly, an optical loss in the absorption polarizer may be reduced and an amount of a light which passes through may be increased, to thereby increase the brightness of the display device.

The absorption polarizer passes light of a specific polarization and absorbs light of other polarizations. The reflection polarizer passes light of a specific polarization and reflects light of other polarizations. Accordingly, when both of the first polarizer 400 and the second polarizer 500 are used as the reflection polarizer, a luminance efficiency of the display device may be increased by using the reflected polarized light.

When the first polarizer 400 and the second polarizer 500 are used as the reflection polarizer, most polarized lights may pass through the display panel, so that the display panel may be glittered to deteriorate visibility. Alternatively, the display panel may be applicable to a billboard, which may tolerate a glittered display panel.

When a light, which passes through the first polarizer 400 and the liquid crystal layer 300 to which an electric field is applied, is incident to the second polarizer 500, a light vibrating only in the second direction may pass through the first polarizer 400. The second direction is perpendicular to a reflection axis of the second polarizer 500 including the reflection polarizer. Another light, which vibrates in the first direction, is reflected by the second polarizer 500.

Although it is not illustrated in the figures, the first polarizer 400 and the second polarizer 500 may further include, for example, a phase difference layer, a protection film, etc. The first polarizer 400 and the second polarizer 500 may include, for example, a polymer material. Examples of the polymer material may include but are not limited to polycarbonate, polystyrene, polyvinyl alcohol, poly methyl methacrylate, polypropylene, polyolefine, polyacrylate, polyamide, etc.

In the display panel, when the first polarizer 400 includes the reflection polarizer, a reddish phenomenon may occur along a column direction of the display panel, which is a vertical direction of the display panel.

The reddish phenomenon may be prevented by decreasing a viewing angle in a column direction of the display panel. As the viewing angle in the column direction is decreased, the reddish phenomenon may disappear.

Figure 4:
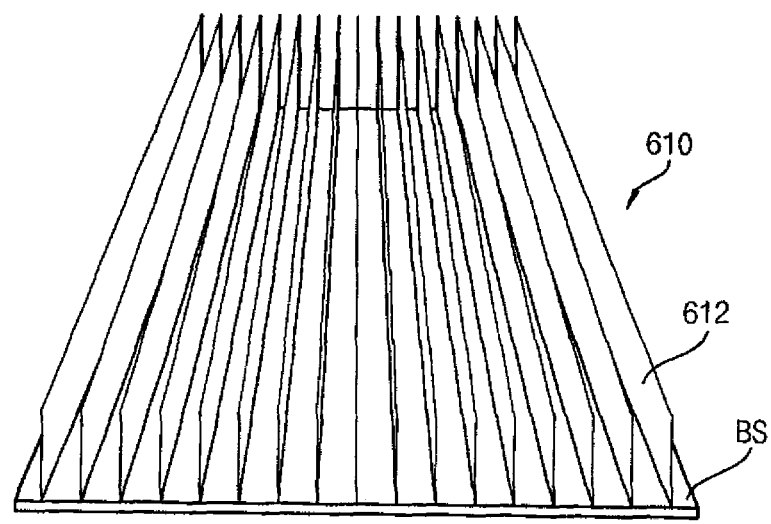
FIG. 4 is a perspective view illustrating a viewing angle control film in accordance with an example embodiment.
Figure 5:
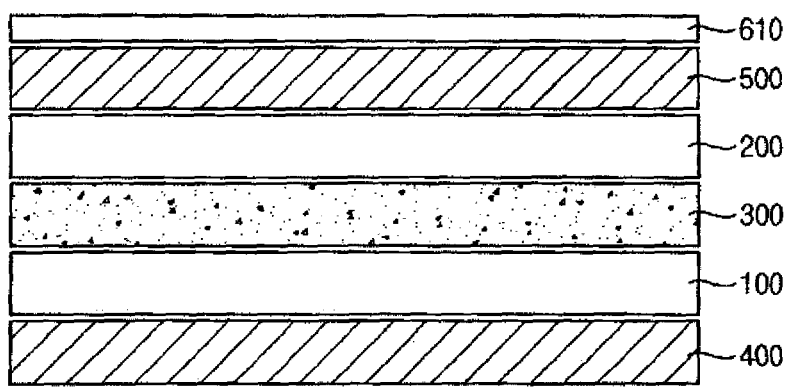
FIG. 5 is a cross-sectional view illustrating a display panel in accordance with an example embodiment including the viewing angle control film in the FIG. 4.
Figure 6:
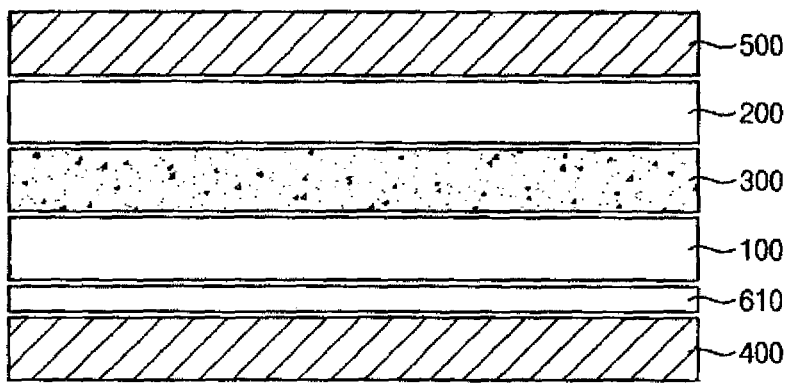
FIG. 6 is a cross-sectional view illustrating a display panel in accordance with an example embodiment including the viewing angle control film in the FIG. 4.

FIG. 4 is a perspective view illustrating a viewing angle control film in accordance with an example embodiment. FIG. 5 is a cross-sectional view illustrating a display panel in accordance with an example embodiment including the viewing angle control film in the FIG. 4. FIG. 6 is a cross-sectional view illustrating a display panel in accordance with an example embodiment including the viewing angle control film in FIG. 4.

Referring to the FIGS. 4 to 6, the viewing angle control film 610 may partially block a light from the display panel such that an image of the display panel may be observed at a front or at a specific viewing angle.

A viewing angle control layer 600 of the display panel may include, for example, a viewing angle control film 610.

The viewing angle control film 610 may include, for example, a base sheet BS and a protrusion portion 612 protruding from an upper surface of the base sheet BS and extending in a direction. The protrusion portion 612 may partially pass a light or partially interfere with the light, to thereby decrease a viewing angle. The protrusion portion 612 may extend, for example, in a first direction on the base sheet BS. The first direction is, for example, parallel with the absorption axis of the viewing angle control film 610.

The protrusion portion 612 may include, for example, a light reflecting material and a light absorbing material. The light reflecting material of the protrusion portion includes, for example, titanium dioxide, zinc oxide, zinc sulfide, zinc phosphate, calcium carbonate, alumina, silica, antimony oxide, barium sulfide, lytopene (co-precipitate of barium sulfide and zinc oxide), calcined kaolin, lead carbonate, magnesium oxide, etc. These may be used alone or in a mixture thereof. The light absorbing material of the protrusion portion 612 includes, for example, carbon black, spinel black, rutile black, iron black, etc. These may be used alone or in a mixture thereof.

For example, the protrusion portion 612 of the viewing angle control film 610 extends in a column direction of the display panel. That is, the protrusion portion 612 may extend, for example, perpendicular to the reflection axis Ra of the first polarizer 400, to thereby decrease the viewing angle. Accordingly, an image of the display panel may be not observed well to a viewer outside the viewing angle range, so that the security of the display device may be increased.

In case that the protrusion portion 612 of the viewing angle control film 610 extends in the row direction of the display panel, a viewing angle in a row direction of the display panel may be decreased. However, a viewing angle in the column direction may not be decreased. Accordingly, when a reflection axis Ra of the first polarizer 400 rotates about 90 degrees, a viewing angle in a column direction may be decreased, to thereby prevent a reddish phenomenon.

Alternatively, when the protrusion portion 612 of the viewing angle control film 610 extends in a row direction of the display panel, a viewing angle in a column direction of the display panel may be decreased without rotating an reflection axis Ra of the first polarizer 400 about 90 degrees.

As mentioned above, an absorption axis of the viewing angle control layer 600 may be controlled to extend in a column direction. That is, the protrusion portion 612 of the viewing angle control film 610 may extend in a row direction. Therefore, the viewing angle in a column direction may be decreased, so that a reddish phenomenon may be prevented.

The absorption axis Tb of the second polarizer 500 may be parallel to the reflection axis Ra of the first polarizer 400.

Accordingly, the absorption axis of the viewing angle control film 610 is parallel to the reflection axis Ra, to thereby prevent the reddish phenomenon.

In the present example embodiment of FIGS. 4 and 5, the viewing angle control film 610 is disposed on the second polarizer 500.

Alternatively, in an example embodiment, as shown in FIG. 6, the viewing angle control film 610 may be disposed between the first substrate 100 and the first polarizer 400.

Figure 7:
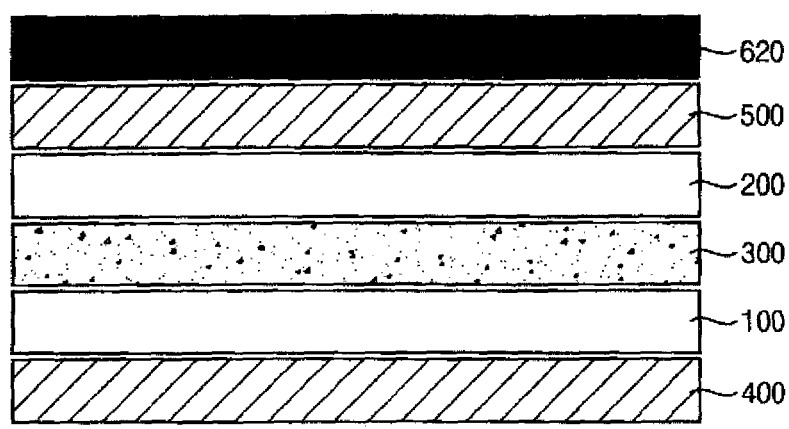
FIG. 7 is a cross-sectional view illustrating a display panel in accordance with an example embodiment including a pattern retarder.

FIG. 7 is a cross-sectional view illustrating a display panel in accordance with an example embodiment including a pattern retarder. FIG. 8 is a cross-sectional view illustrating the pattern retarder in the display panel of FIG. 7.

Referring to FIG. 7 and FIG. 8, a viewing angle control layer 600 may include, for example, a pattern retarder 620.

The pattern retarder 620 may include, for example, a surface treatment layer 621, a base layer 622 having a birefringence, a pattern retarding layer 623 disposed on a lower surface of the base layer 622 and including patterns having a different optical axis from each other and an adhesive layer 626 disposed on a lower surface of the pattern retarding layer 623.

The surface treatment layer 621 may be used to decrease a reflection by an external light. However, the surface treatment layer 621 may be omitted for simplicity.

The base layer 622 may include, for example, an organic macromolecule. A thickness of the base layer 622 may be controlled to obtain a desired retardation value. Examples of the organic macromolecule may include but are not limited to triacetyl cellulose (TAC), cyclo olefin copolymer (COP), polyacrylate (PAC), polyetheretherketone (PEEK), polyvinylalchol (PVA), etc.

The pattern retarding layer 623 may include, for example, a first retarder 624 converting a first light into a first polarization, a second retarder 625 converting a second light into a second polarization, and a black matrix (BM) 627 disposed on lower surfaces of the first retarder 624 and the second retarder 625 to cover boundary portions between the first retarder 624 and the second retarder 625.

The pattern retarder layer 623 may include, for example, the first retarder 624 and the second retarder 625. The first retarder 624 and the second retarder 625 may be disposed, for example, alternately in a column direction of the display panel.

As illustrated in FIG. 7, the adhesive layer 626 may be, for example, adhered to the second polarizer 500 of the display panel and the pattern retarder 620. Therefore, the adhesive layer 626 may be disposed, for example, on an upper surface of the second polarizer 500. Alternatively, the pattern retarder 620 may be disposed, for example, between the first substrate 100 and the first polarizer 400.

The black matrix 627 may be disposed, for example, on lower surfaces of the first retarder 624 and the second retarder 625 to cover boundary portions between the first retarder 624 and the second retarder 625. Therefore, the black matrix 627 overlaps boundary portions between the first retarder 624 and the second retarder 625. The black matrix 627 partially blocks a light which is incident to the display panel, so that the viewing angle may be decreased in a column direction.

The black matrix 627 prevents the light from passing between pixel areas adjacent to each other. Therefore, the black matrix 627 prevents the lights passing through the pixel areas from interfering with each other.

The black matrix 627 may have, for example, a black color. The black matrix 627 may include, for example, a photoresist (PR).

The photoresist (PR) layer may be patterned, for example, using a mask to form the black matrix 627 by an exposure process.

The black matrix 627 may be arranged, for example, to be parallel with the reflection axis Ra of the first polarizer 400.

For example, the black matrix 627 may be formed to have a linear shape extending in a row direction. The black matrix 627 of the pattern retarder 620 may be disposed, for example, in a row direction, so that the viewing angle may be decreased in a column direction. Therefore, a reddish phenomenon may be prevented. When the black matrix 627 of the pattern retarder 620 is formed to extend in the row direction, the reflection axis Ra of the first polarizer 400 of the display panel does not need to be rotated.

Alternatively, the black matrix 627 of the pattern retarder 620 may be formed to have, for example, a dotted pattern in a column direction. In this case, because the black matrix 627 having a dotted pattern extends in the column direction, the reflection axis Ra of the first polarizer 400 is controlled to be rotated about 90 degrees, to thereby decrease the viewing angle.

The absorption axis Tb of the second polarizer 500 is, for example, parallel to the reflection axis Ra of the first polarizer 400. The black matrix 627 of the pattern retarder 620 is disposed to be, for example, parallel to the reflection axis Ra of the first polarizer 400, so that the viewing angle may be decreased in a column direction of the display panel. Therefore, a reddish phenomenon may be prevented.

Figure 10:
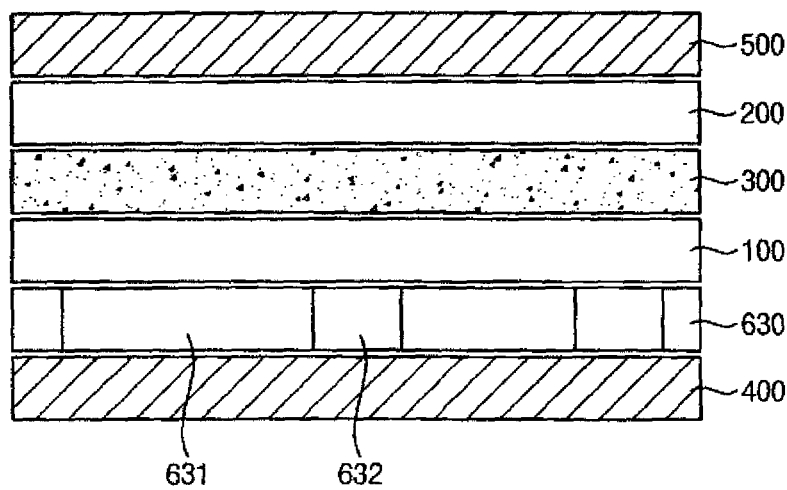
FIG. 10 is a cross-sectional view illustrating a display panel in accordance with an example embodiment including a parallax barrier layer.

FIG. 9 is a cross-sectional view illustrating a display panel in accordance with an example embodiment including a parallax barrier layer. FIG. 10 is a cross-sectional view illustrating a display panel in accordance with an example embodiment including a parallax barrier layer.

A viewing angle control layer 600 may include, for example, a parallax barrier layer 630.

The parallax barrier layer 630 may include, for example, a plurality of parallax barriers 631 and a wire grid polarizer 632 disposed between the plurality of parallax barriers 631.

The parallax barrier 630 may be formed in, for example, a matrix-shape and a stripe-shape.

A light emitted from a backlight assembly 700 is incident to the parallax barriers 631, and thus the light may be reflected. When a light passes through the wire grid polarizer 632, an image may be displayed to a viewer.

The parallax barrier layer 630 may extend, for example, in a row direction of the display panel.

The parallax barrier layer 630 includes, for example, a parallax barrier 631, to thereby block a light. Therefore, a cross talk may be prevented and brightness may be increased. Accordingly, the parallax barrier 631 partially blocks a light, so that a viewing angle may be decreased in a column direction of the display panel.

The absorption axis Tb of the second polarizer 500 may be, for example, parallel to the reflection axis Ra of the first polarizer 400. The parallax barrier 631 of the parallax barrier layer 630 is, for example, parallel to the reflection axis Ra of the first polarizer 400, so that the viewing angle may be decreased in a column direction. Therefore, a reddish phenomenon may be prevented.

The parallax barrier 631 may reflect a light emitted from a backlight assembly 700. The light emitted from a backlight assembly 700 may pass through the wire grid polarizer 632.

The parallax barrier 631 may include, for example, a light reflecting material. Examples of a light reflecting material may include but are not limited to titanium dioxide, zinc oxide, zinc sulfide, zinc phosphate, calcium carbonate, alumina, silica, antimony oxide, barium sulfide, lytopene (co-precipitate of barium sulfide and zinc oxide), calcined kaolin, lead carbonate, magnesium oxide, etc. These may be used alone or in a mixture thereof.

In the present example embodiment, the parallax barrier layer 630 is disposed on the second polarizer 500.

Alternatively, in an example embodiment, as shown in FIG. 10, the parallax barrier layer 630 may be disposed between the first substrate 100 and the first polarizer 400.

Having described example embodiments of the present invention, it is further noted that it is readily apparent to those of ordinary skill in the art that various modifications may be made without departing from the spirit and scope of the invention which is defined by the metes and bounds of the appended claims.

What is claimed is:

1. A display panel, comprising:
a first substrate;
a second substrate facing the first substrate;
a liquid crystal layer disposed between the first substrate and the second substrate;
a first polarizer disposed on a lower surface of the first substrate and including a first polarizing layer and a second polarizing layer stacked on each other, wherein the first polarizing layer comprises an isotropic macromolecular material and the second polarizing layer comprises a macromolecular material having a positive birefringence;
a second polarizer disposed on an upper surface of the second substrate; and
a viewing angle control layer disposed on the first polarizer, wherein the viewing angle control layer is configured to control a viewing angle of a column direction of the display panel,
wherein the viewing angle control layer comprises a pattern retarder,
wherein the pattern retarder comprises:
a base layer having a birefringence;
a pattern retarding layer disposed on a lower surface of the base layer and including patterns having a different optical axis from each other; and
an adhesive layer disposed on a lower surface of the pattern retarding layer,
wherein the pattern retarding layer comprises:
a first retarder configured to convert a first light to a first polarization;
a second retarder configured to convert a second light to a second polarization; and
a black matrix disposed on lower surfaces of the first retarder and the second retarder to cover boundary portions between the first retarder and the second retarder, and
wherein the black matrix makes contact with the lower surfaces of the first and second retarders.

2. The display panel of claim 1, wherein the viewing angle control layer is disposed on the upper surface of the second polarizer.

3. The display panel of claim 1, wherein the viewing angle control layer is disposed between the first substrate and the first polarizer.

4. The display panel of claim 1, wherein the first polarizer is a reflection polarizer, and the second polarizer is an absorption polarizer.

5. The display panel of claim 1, wherein the first polarizer and the second polarizer is a reflection polarizer.

6. The display panel of claim 1, wherein an absorption axis of the second polarizer is parallel to a reflection axis of the first polarizer.

7. The display panel of claim 1, wherein the viewing angle control layer comprises a viewing angle control film, and the viewing angle control film includes a base sheet and a protrusion portion protruding from an upper surface of the base sheet and extending in a direction.

8. The display panel of claim 7, wherein an absorption axis of the viewing angle control layer is parallel to a reflection axis of the first polarizer.

9. The display panel of claim 1, wherein the black matrix is parallel to a reflection axis of the first polarizer.

10. The display panel of claim 1, wherein the viewing angle control layer comprises a parallax barrier layer, and the parallax barrier layer includes a plurality of parallax barriers and a wire grid polarizer disposed between the plurality of parallax barriers.

11. The display panel of claim 10, wherein an absorption axis of the parallax barrier is parallel to a reflection axis of the first polarizer.

12. The display panel of claim 1, wherein the first polarizer comprises:
a first layer comprising the first polarizing layer;
a second layer stacked directly on the first layer, the second layer comprising the second polarizing layer;
a third layer stacked directly on the second layer, the third layer comprising the first polarizing layer; and
a fourth layer stacked directly on the third layer, the fourth layer comprising the second polarizing layer.

13. A display device, comprising:
a display panel comprising:
a first substrate, a second substrate facing the first substrate, a liquid crystal layer disposed between the first substrate and the second substrate, a first polarizer disposed on a lower surface of the first substrate and including a first polarizing layer and a second polarizing layer stacked on each other, a second polarizer disposed on an upper surface of the second substrate, and a viewing angle control layer disposed on the first polarizer, wherein the viewing angle control layer is configured to a viewing angle of a column direction of the display panel; and a backlight assembly configured to provide a light to the display panel, wherein the viewing angle control layer comprises a pattern retarder, wherein the pattern retarder comprises:

a base layer having a birefringence;

a pattern retarding layer disposed on a lower surface of the base layer and including patterns having a different optical axis from each other; and an adhesive layer disposed on a lower surface of the pattern retarding layer, wherein the pattern retarding layer comprises:

a first retarder configured to convert a first light to a first polarization;

a second retarder configured to convert a second light to a second polarization; and a black matrix disposed on lower surfaces of the first retarder and the second retarder to cover boundary portions between the first retarder and the second retarder, and wherein the black matrix makes contact with the lower surfaces of the first and second retarders, and wherein the first polarizing layer of the first polarizer comprises an isotropic macromolecular material and the second polarizing layer of the first polarizer comprises a macromolecular material having a positive birefringence.

14. The display apparatus of claim 13, wherein the viewing angle control layer is disposed on the upper surface of the second polarizer.

15. The display device of claim 13, wherein the viewing angle control layer is disposed between the first substrate and the first polarizer.

16. The display device of claim 13, wherein the viewing angle control layer comprises a viewing angle control film, and the viewing angle control film includes a base sheet and a protrusion portion protruding from an upper surface of the base sheet and extending in a direction.

17. The display device of claim 16, wherein the protrusion portion includes a light reflecting material and a light absorbing material.

18. The display device of claim 17, wherein the light reflecting material of the protrusion portion includes at least one selected from the group consisting of titanium dioxide, zinc oxide, zinc sulfide, zinc phosphate, calcium carbonate, alumina, silica, antimony oxide, barium sulfide, lytopene (co-precipitate of barium sulfide and zinc oxide), calcined kaolin, lead carbonate, and magnesium oxide and wherein the light absorbing material of the protrusion portion includes at least one material selected from the group consisting of carbon black, spinel black, rutile black, and iron black.

19. The display device of claim 13, wherein the viewing angle control layer comprises a parallax barrier layer, and the parallax barrier layer includes a plurality of parallax barriers and a wire grid polarizer disposed between the plurality of parallax barriers.

20. The display device of claim 19, wherein the plurality of parallax barriers include at least one light reflecting material selected from the group consisting of titanium dioxide, zinc oxide, zinc sulfide, zinc phosphate, calcium carbonate, alumina, silica, antimony oxide, barium sulfide, lytopene (co-precipitate of barium sulfide and zinc oxide), calcined kaolin, lead carbonate, and magnesium oxide.

21. The display device of claim 13, wherein an absorption axis of the second polarizer is perpendicular to an absorption axis of the first polarizer or wherein a reflection axis of the second polarizer is parallel to an absorption axis of the first polarizer.

22. A display device, comprising:

a display panel comprising:

a first substrate, a second substrate facing the first substrate, a liquid crystal layer disposed between the first substrate and the second substrate, a first polarizer disposed on a lower surface of the first substrate and including a first polarizing layer and a second polarizing layer stacked on each other, a second polarizer disposed on an upper surface of the second substrate, and a viewing angle control layer disposed on the first polarizer, wherein the viewing angle control layer is configured to control a viewing angle of a column direction of the display panel, an optical sheet disposed on a lower surface of the first polarizer; and a backlight assembly disposed on a lower surface of the optical sheet and configured to provide a light to the display panel, wherein the viewing angle control layer comprises a pattern retarder, wherein the pattern retarder comprises:

a base layer having a birefringence;

a pattern retarding layer disposed on a lower surface of the base layer and including patterns having a different optical axis from each other; and an adhesive layer disposed on a lower surface of the pattern retarding layer, wherein the pattern retarding layer comprises:

a first retarder configured to convert a first light to a first polarization;

a second retarder configured to convert a second light to a second polarization; and a black matrix disposed on lower surfaces of the first retarder and the second retarder to cover boundary portions between the first retarder and the second retarder, and wherein the black matrix makes contact with the lower surfaces of the first and second retarders, and wherein the first polarizing layer of the first polarizer comprises an isotropic macromolecular material and the second polarizing layer of the first polarizer comprises a macromolecular material having a positive birefringence.

23. The display device of claim 22, wherein the first polarizing layer includes a birefringence material and wherein the second polarizing layer includes a material having a reflective index different from the birefringence material of the first polarizing layer.

24. The display device of claim 22, wherein the backlight assembly includes a light guide plate, a light source disposed at a side of the backlight assembly and configured to emit light to the light guide plate, and a reflection plate disposed on a lower surface of the light guide plate and configured to reflect the light emitted to the light guide plate.

* * * * *